Dec. 24, 1940.    L. C. WADSWORTH    2,226,272
NUTCRACKER
Filed April 25, 1939
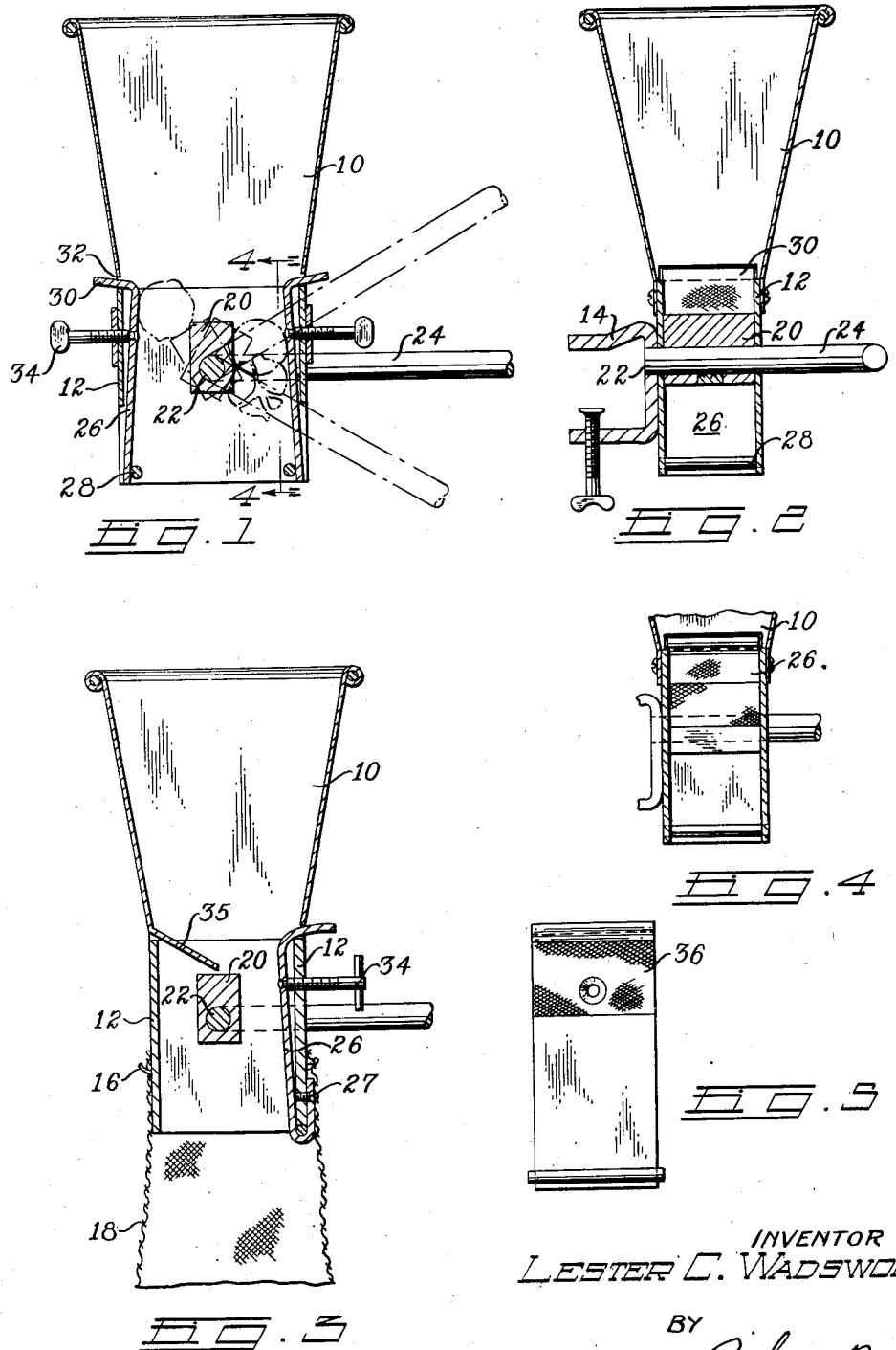
INVENTOR
LESTER C. WADSWORTH
BY
Parker & Burton
ATTORNEYS Patented Dec. 24, 1940

2,226,272

UNITED STATES PATENT OFFICE 2,226,272

NUTCRACKER

Lester C. Wadsworth, Detroit, Mich.

Application April 25, 1939, Serial No. 269,964

10 Claims. (Cl. 146—13)

This invention relates to improvements in nutcrackers.

An object is to provide an improved nutcracker adapted to contain a large number of nuts and adapted to be operated to successively crack the nuts and discharge the cracked nuts.

This improved nutcracker is adapted for either household or commercial use. The invention is here shown as embodied in a manually operable machine but a plurality of machines might be arranged in a battery and suitable power operating mechanism provided to actuate them.

More particularly, this improved nutcracker embodies a hopper having a discharge spout and cracking mechanism associated with the hopper spout and adapted upon actuation to receive the nuts from the hopper and to successively crack and discharge the nuts one after the other.

A further meritorious feature is that this nutcracker is readily adjustable to crack nuts of varying size and the construction is such that uncracked nuts cannot pass through the machine for discharge therefrom.

The mechanism of the machine may be so set that for a nut of a given size to pass through the machine it must first be cracked and after it is cracked the nut is automatically discharged from the machine.

This improved nutcracker is of simple and rugged construction and comprises a minimum number of strong sturdy parts. It is small, compact, and inexpensive. It is readily attachable to a table or other supporting structure when desired for use and it is easily operable by hand with minimum exertion or effort. The nuts are so cracked by the machine that the nut meats generally come out whole without crushing or breaking up into small pieces.

Other objects, advantages and meritorious features of the invention will more fully appear from the following description, appended claims, and accompanying drawing, wherein:

Figure 1 is a vertical sectional view through a structure embodying this invention, Fig. 2 is a vertical sectional view taken at right angles to the view of Fig. 1, Fig. 3 is a vertical sectional view taken on the same line as Fig. 1 but disclosing a slightly modified form of construction, Fig. 4 is a fragmentary sectional view through the structure shown in Fig. 1 taken on line 4—4 of such figure, and Fig. 5 is an elevation of one of the anvil like elements shown in Fig. 1.

This improved nutcracker comprises an enclosure which is here shown as in the shape of a hopper 10 open at the top and provided at its open bottom with a spout like discharge outlet 12. The hopper is adapted to contain a plurality of nuts to be cracked. The enclosure is provided with a clamp 14 of conventional construction which is adapted to engage the edge of the table or other supporting structure. The spout of the enclosure may be provided with tangs or the like 16 upon which a sack or suitable receptacle 18 may be hung to catch the cracked nuts.

A hammer like element 20 extends transversely across the interior of the spout and is journalled at opposite ends thereof by means of a shaft 22. The shaft terminates at one end on the outside of the enclosure in a handle portion 24 by means of which the hammer may be rockably oscillated as shown by the dotted line positions in Fig. 1. Preferably this hammer element 20 is of a generally rectangular shape and its pivotal support 20 is disposed below its transverse median line so that when its upper portion is rocked away from one side wall as shown in Fig. 1 a nut may fall into place between such side wall and the hammer element. When the hammer element is rocked in the reverse direction it crushes the nut against the side wall and urges the cracked nut downwardly through the discharge spout.

I prefer to provide that side wall of the spout against which a nut is to be cracked with an anvil-like face portion. This anvil element may be in the form of a plate 26 and as shown in Fig. 1 this plate may be pivotally supported by a pivot rod 28 seated at opposite ends in the walls of the spout as shown in Fig. 2. The opposite upper end 35 of the plate may be provided with an angular portion 30 extending through a slot 32 in the side wall of the enclosure as shown in Fig. 1.

In Figs. 1 and 2 two of these anvil plates are shown. Each is provided with an adjustment 40 screw 34 which is threaded in the reinforcing side wall 12 of the spout and which is engaged with the anvil plate so that the plate may be supported at adjusted positions with respect to the hammer 20. The plate may be provided with a 45 roughened anvil portion 36 directly opposite the hammer and against which the nuts are cracked by the hammer.

In Fig. 3 a machine of smaller size is shown which is provided with only one anvil plate 26. 50 This plate is also provided with the adjusting screw 34 whereby it may be positioned but the plate itself is formed of spring steel and it is secured adjacent its lower edge to the side wall 12 of the spout by screws 27 or the like and upon 55 adjustment it is sprung toward and away from the hammer 20. In order to prevent nuts from lodging between the opposite side of the hammer and the spout, as this construction is not provided with a second anvil plate, there is provided a deflector plate or lip 35 extending inwardly from the opposite side wall enclosure over the hammer element as shown in Fig. 3.

To operate, the hopper is filled with nuts and the handle 24 is rocked back and forth. As the upper portion of the hammer rocks away from the anvil a nut will fall between the hammer and the anvil plate. The anvil plate has previously been so adjusted that the nuts being cracked are too large to pass in the uncracked state between the anvil and hammer. When the upper portion of the hammer is swung back toward the anvil the nut is cracked thereagainst. The cracked nut is forced downwardly out of the spout and may be collected in the sack 13 as above set forth. The operation is continued until all the nuts have fallen from the hopper.

What I claim:

1. A nutcracker comprising a hopper enclosure provided with a discharge spout, a hammer like element extending transversely across the interior of said spout and pivotally supported therein for rockable movement towards and away from opposite side walls of the spout, each of said side walls provided with an anvil like element rockably supported adjacent its bottom margin below said hammer and extending upwardly above said hammer, each anvil element being angularly adjustable about its support to a plurality of positions extending upwardly and inwardly therefrom toward and above said hammer, and means engaging each anvil adjustable to support the anvil at each of said inwardly inclined adjusted positions.

2. A nutcracker comprising a hopper like enclosure provided with a discharge spout, a hammer like element extending transversely across the interior of said spout and pivotally supported therein for rockable movement toward and away from one side of the spout, an anvil like element secured adjacent to its lower edge to such side of the spout below said hammer and extending upwardly from such point of securement to a point above the hammer, means supporting said anvil like element for angular adjustment about said point of securement to a plurality of positions extending upwardly and inwardly from said point of securement toward said hammer; and a baffle extending transversely across the spout superposing the hammer and extending from a point above the hammer outwardly toward that side wall of the spout opposite the anvil.

3. A nutcracker comprising a hopper like enclosure having a discharge spout, a hammer like element extending transversely across the interior of the spout and journalled for rockable movement toward and away from opposite sides of the spout, a pair of anvil like elements overlying the two sides of the spout and toward which and away from which said hammer is swung in its rockable movement, each of said anvil elements being rockably supported at its lower edge below said hammer and extending therefrom upwardly above the hammer, means coupled with each anvil adjustable to support the anvil at a plurality of positions inclined upwardly and toward said hammer.

4. A nutcracker comprising a hopper provided with a discharge spout having opposed side walls, a hammer like element pivotally supported within said spout for swinging movement toward and away from said opposed side walls and extending upwardly from its pivotal support, an anvil element overlying each side wall and rockably supported at its lower edge and extending upwardly from its rockable support, each anvil element being rockably adjustable about its lower edge to a plurality of positions inclined upwardly and inwardly toward the hammer, each anvil element having an outwardly bent flange at its upper edge cooperating with the adjacent side wall of the spout and operable at each of said adjusted positions to close the space between the upper edge of the anvil and the adjacent side wall of the spout.

5. A nutcracker comprising a hopper like enclosure having a discharge spout, a hammer like element extending transversely across the interior of the spout and journalled in opposite ends thereof for rockable movement toward and away from the opposite side walls of the spout, an anvil like element overlying one of said side walls of the spout and rockably supported at its bottom edge below said hammer and extending upwardly above said hammer for adjustment to a plurality of positions at which it extends upwardly above and inwardly toward the hammer, said side walls having a slit therethrough, said anvil element having its upper edge bent to form a flange extending through said slit.

6. A nutcracker having a chamber for nuts, and three cooperating elements within said chamber for cracking said nuts, two of said elements being in the form of laterally spaced upright plate-like anvils overlying opposed side walls of the chamber, the third of said elements being between the laterally spaced elements and in the form of a pivotally mounted hammer for cracking nuts on the anvils, said third mentioned element being mounted transversely of the chamber so as to swing toward and from the spaced anvils, and said anvils normally inclining downwardly and outwardly from points above to points below said third mentioned element so that the space above the hammer for the reception of uncracked nuts is smaller than the space below the hammer for the cracked nuts.

7. A nutcracker having a chamber for nuts, a rockshaft journaled in opposite upright walls of said chamber substantially midway the upper and lower ends thereof, three cooperating elements within said chamber for cracking said nuts, two of said elements being in the form of upright plate-like anvils upon opposite sides of said shaft, the third element being in the form of an elongated hammer fixed to and extending upwardly from said rockshaft for cracking nuts on said plate-like anvils adjacent their upper ends, said plate-like anvils inclining upwardly and inwardly toward said rockshaft from points adjacent the lower ends of said upright walls to points adjacent the upper ends thereof so that the space above the rockshaft for the reception of uncracked nuts is smaller than the space below the shaft for cracked nuts, and adjusting means for said plate-like anvils carried by the upright walls aforesaid of the chamber adjacent their upper ends and operable to increase or diminish the inward inclination of the plate-like anvils.

8. A nutcracker having a chamber for nuts, a rockshaft journaled in opposite upright walls of said chamber substantially midway the upper and lower ends thereof, three cooperating elements within said chamber for cracking said nuts, two of said elements being in the form of upright plate-like anvils upon opposite sides of said shaft, the third element being in the form of an elongated hammer fixed to and extending upwardly from said rockshaft for cracking nuts on said plate-like anvils adjacent their upper ends, said plate-like anvils inclining upwardly and inwardly toward said rockshaft from points adjacent the lower ends of said upright walls to points adjacent the upper ends thereof so that the space above the rockshaft for the reception of uncracked nuts is smaller than the space below the shaft for cracked nuts, said plate-like anvils having laterally projecting flanges at their upper ends cooperating with the adjacent upright walls of the chamber to cover the spaces between the upper ends of said anvils and said adjacent side walls to thereby prevent nuts or parts thereof from falling into said spaces.

9. A nutcracker having a chamber for nuts, a rockshaft journaled in opposite upright walls of said chamber substantially midway the upper and lower ends thereof, two cooperating elements within said chamber for cracking said nuts, one of said elements being in the form of an upright plate-like anvil at one side of said shaft, the second element being in the form of an elongated hammer fixed to and extending upwardly from said rockshaft for cracking nuts on said plate-like anvil adjacent its upper end, said plate-like anvil being adjacent one of the upright walls of the chamber and inclining upwardly and inwardly toward said rockshaft from a point adjacent the lower end of said upright wall to a point adjacent the upper end thereof, and adjusting means for said plate-like anvil carried by the adjacent upright wall aforesaid of the chamber adjacent its upper end and operable to increase or diminish the inward inclination of the plate-like anvil.

10. A nutcracker having a chamber for nuts, a rockshaft journaled in opposite upright walls of said chamber substantially midway the upper and lower ends thereof, two cooperating elements within said chamber for cracking said nuts, one of said elements being in the form of an upright plate-like anvil at one side of said shaft, the second element being in the form of an elongated hammer fixed to and extending upwardly from said rockshaft for cracking nuts on said plate-like anvil adjacent its upper end, said plate-like anvil being adjacent one of the upright walls of the chamber and inclining upwardly and inwardly toward said rockshaft from a point adjacent the lower end of said upright wall to a point adjacent the upper end thereof, said plate-like anvil having a laterally projecting flange at its upper end cooperating with the adjacent upright wall of the chamber to cover the space between the upper end of said anvil and said adjacent side wall to thereby prevent nuts or parts thereof from falling into said space.

LESTER C. WADSWORTH.